June 6, 1944.  E. A. MILLONIG  2,350,794
FINISHING TOOL
Filed Dec. 7, 1942
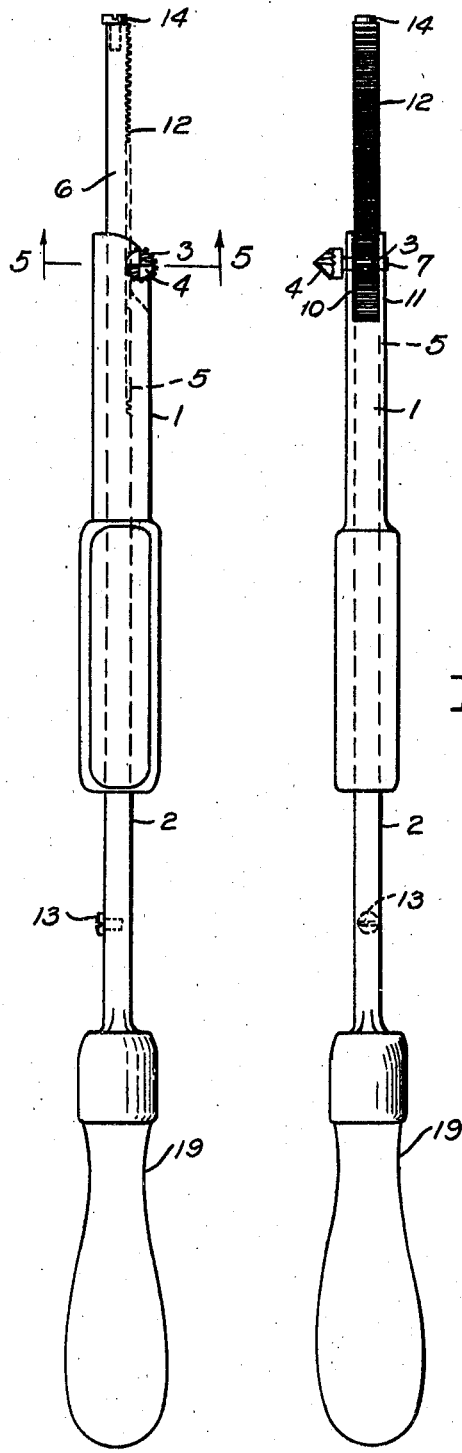
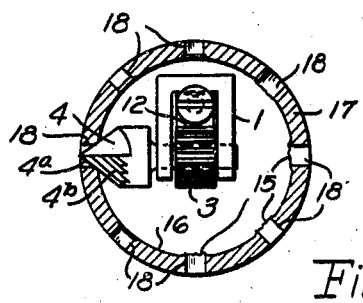
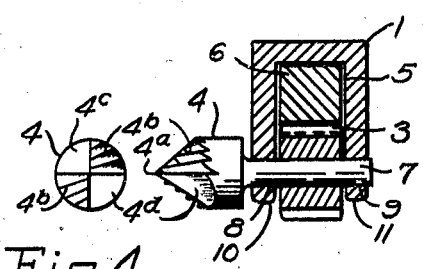
INVENTOR.
E.A. Millonig
BY Robt x Robb
ATTORNEYS.

Patented June 6, 1944

2,350,794

UNITED STATES PATENT OFFICE 2,350,794

FINISHING TOOL

Edward A. Millonig, Dayton, Ohio

Application December 7, 1942, Serial No. 468,161

7 Claims. (Cl. 77—73.5)

This invention relates to finishing tools particularly adapted for use in finishing metal parts. The tool of the invention has particular application to such operations as the removal of burrs, abraiding, buffing, reaming, drilling and similar operations.

It is the principal object of the present invention to provide a tool of the class and for the purposes mentioned which is capable of performing operations of this nature on surfaces which are positioned at an angle to the direction of the application of the tool. Ancillary to the foregoing object one of the purposes of the invention is to provide a tool of the class described in which the working member which is adapted to engage with the work is designed for movement on an axis at an angle to the direction of application of the tool.

Another object of the invention is to provide a tool of the class described comprising actuating means cooperable with a working member for operation of the latter in such a manner that actuating movement of said means in one direction will accomplish a working movement of the working member on an axis at an angle to the direction of actuating movement of said means.

In the production of small metal sleeve members which are to be provided with holes drilled therein, the drilling operation leaves burrs or roughnesses in the metal adjacent the inner ends of drilled holes on the inner wall of the sleeve. The removal of the burrs or roughnesses at such locations interior of the metal sleeve part is often a most difficult operation due to the inaccessibility and inability to properly manipulate tools heretofore provided so as to accomplish the desired operation on the inside of a small metal sleeve or like part. The inner diameter of the part is often so small that the location of the burrs or roughnesses is inaccessible to tools heretofore provided, or the condition is such that the tool cannot be properly directed to the location desired even if the location is more or less accessible to the tool. Even if the roughened portion can be reached by the tool, the tool often cannot be directed properly so as to accomplish the desired operation without scratching the inner surface of the metal part or without undesirably enlarging the opening.

The present invention contemplates the provision of a tool adapted particularly for the removal of burrs or roughnesses in the metal adjacent the drilled holes on the inner wall of a small metal sleeve or like part, and is designed to overcome the above mentioned disadvantages in connection with tools heretofore provided.

The tool of the present invention, in its embodiment herein disclosed, comprises guide means, and actuating means comprising an actuating member cooperable with said guide means for sliding movement relative thereto, and a working means operable by said actuating member upon sliding movement of said member relative to said guide means. The working means, in the embodiment herein disclosed, comprises a burr removing member mounted on the guide means to rotate about an axis at an angle, in this case perpendicular, to the direction of movement of the actuating member. The actuating member includes rack teeth cooperating with a pinion fixed to the shaft upon which the working member is mounted. The guide means includes means which may be engaged by the hand of the operator for manipulating the tool into the proper position and for holding the tool so that the working member is in proper engagement with the work. The actuating member includes handle means extending exteriorly of the guide means and by which the actuating means may be moved by the hand of the operator so as to effect rotation of the working member.

The working member is of special design adapted particularly for the removal of the burrs or roughnesses in the metal without enlarging the holes in a metal sleeve or like part with which the tool is used and without scratching or marring the surface of said part.

Other objects, advantages and features of novelty will become apparent as the description of the invention proceeds in conjunction with the accompanying drawing in which—

Figure 1 is an elevational view of a tool embodying the invention.

Figure 2 is a plan view of the same.

Figure 3 is an enlarged and elevational view of the same looking toward the working end thereof and showing the same in operative position with the working end of the tool positioned within a metal sleeve and the working member operatively engaged with the sleeve and axially aligned with a hole drilled radially through the sleeve, said sleeve being shown in section.

Figure 4 is an end elevation of the working member comprising a part of the tool of the invention.

Figure 5 is a sectional view taken on the line 5—5 of Figure 1.

Now referring to the drawing for a detailed description of the invention, the finishing tool of the invention comprises guide means generally designated by the numeral 1; actuating means comprising an actuating member generally designated by the numeral 2, and also comprising the pinion member 3; and working means which in the present instance takes the form of a burr removing member 4.

The guide means 1 may be in the form of a hollow sleeve member as shown, having a passage 5 of rectangular configuration extending therethrough. The shank portion 6 of the actuating member 2 may have a corresponding rectangular configuration so that said shank portion 6 is slidingly receivable in the passage 5 of the guide means 1, and the said shank portion 6 is adapted for sliding reciprocating motion within and longitudinally of the passage 5.

The working member 4 is rotatably mounted relative to the guide means 1 and for this purpose said working member 4 may be fixed to or formed integrally with a pinion shaft 7 journalled in suitable openings 8 and 9 respectively provided in spaced bearing portions 10 and 11 of the guide member 1. The pinion 3 is fixed to the shaft 7 for rotation therewith, said pinion being positioned intermediate the spaced bearing portions 10 and 11 when the parts are operatively assembled.

The actuating member is provided with a handle 19 and shank 6 of the actuating member is provided with rack teeth 12 meshing with the pinion 3 for rotation of the pinion 3, pinion shaft 7, and working member 4, upon sliding movement of the shank portion 6 longitudinally of the passage 5. The shank 6 of the actuating member 2 may be provided with stop or abutment means for limiting the extent of movement of the actuating member 2 relative to the guide means 1 and for preventing unauthorized removal of the actuating member from the passage 5. For this purpose the stop or abutment means may conveniently comprise the screws 13 and 14 threaded into the shank 6 as shown, said stop or abutment members 13 and 14 being adapted to abut with opposite ends of the guide sleeve or housing 1 and said members 13 and 14 being spaced from one another a sufficient distance to allow a movement of the actuating member 2 relative to the guide means 1 corresponding to that length of the shank 6 which is provided with the rack teeth 12.

In the use of the tool of the invention for the purpose of removing burrs such as indicated at 15 from the inner wall 16 of a metal sleeve part such as 17, the tool is inserted interiorly of the sleeve 17 in the manner indicated in Fig. 3 so that the tapered or pointed part 4a of the working member 4 extends into one of the drilled holes 18 around the inner edge of which the burrs 15 occur. With the tool inserted in the sleeve 17 and the conical part 4a of the working member held firmly in the hole 18, as shown, the actuating member 2 is caused to be slidingly reciprocated relative to the guide means 1 longitudinally of the passage 5, thereby rotating the working member 4 through the interaction of the rack teeth 12 and pinion 3 so that the cutting teeth 4b of the working member 4 cut off the burrs 15.

Referring particularly to Fig. 4 attention is directed to the arrangement of the teeth 4b on the tapered portion of the working member 4. This tapered portion is of generally conical configuration and the teeth are arranged on two opposed sectors with two blank sectors 4c and 4d intermediate the toothed sectors. The teeth 4b are substantially spirally arranged and range from the longest extending to the apex 4a and progressively diminish in length as shown, the shorter teeth extending to the edge of the adjacent blank sector. The blank sectors 4c and 4d slope smoothly to the top of the cutting edges of the respective longer teeth defining said blank sectors which are cut away or backed down below the ends of the shorter teeth. Thus the cutting teeth are relieved and cut only when the working member is rotated in one direction but do not cut when the working member is rotated in the other direction, whereby rotation of the working member in one direction performs only a light abrading action whereas when the working member is rotated in the other direction it performs a heavier cutting action.

It will be apparent that the construction of the tool of the invention is such that its working end may be inserted within a sleeve of very small diameter and so inserted in such a manner that the working member may be inserted in and positioned axially of a hole drilled radially through such sleeve, whereby the working member may operably move or rotate on an axis at an angle to or perpendicular to the axis along which the tool is inserted in the sleeve, and said working member may operably move or rotate on an axis at an angle to or perpendicular to the direction of movement of the actuating member.

In order to properly accomplish the objective of removal of the burrs 15 occurring at the inner edges of the holes 18 without enlarging the hole more on one side than on another, or otherwise unevenly, it is important that the working member, such as the member 4, be capable of being positioned axially of the hole 18, which is drilled radially through the sleeve 17, and the working member 4 is shown so positioned with respect to one of the holes 18, in Figure 3, with the working end of the tool as a whole inserted within the sleeve 17 axially of the latter.

Having thus described my invention, what I claim as new and desire to secure by Letters Patent of the United States is:

1. A tool of the class described comprising, in combination, a guide sleeve, a working member associated with said sleeve for working movement relative thereto, actuating means for effecting working movement of said working member, said actuating means comprising an actuating member movable within said sleeve on an axis substantially coaxial with the axis of the sleeve, said axes being angularly disposed with respect to the axis of movement of the working member, said sleeve encompassing a substantial length of said actuating member, the working member extending from the sleeve in a direction laterally of the sleeve axis to a distance not exceeding the greatest dimension of the other elements of the tool in the same direction.

2. A tool of the class described comprising, in combination, a guide sleeve, a working member associated with said sleeve for working movement relative thereto, actuating means for effecting working movement of said working member, said actuating means comprising an actuating member movable within said sleeve on an axis substantially coaxial with the axis of the sleeve, said axes being angularly disposed with respect to the axis of movement of the working member, said sleeve encompassing a substantial length of said actuating member, said sleeve constituting hand engaging means adapted to be grasped by the operator's hand for supporting and guiding the tool in the operation thereof, and said actuating means including hand engaging means extending exteriorly of said sleeve, the working member extending from the sleeve in a direction laterally of the sleeve axis to a distance not exceeding the greatest dimension of the other elements of the tool in the same direction.

3. A tool of the class described comprising, in combination, a guide sleeve, a working member rotatably mounted on said sleeve, actuating means for rotating said working member, said actuating means comprising an actuating member reciprocable within said sleeve on an axis substantially coaxial with the axis of the sleeve, said axes being angularly disposed with respect to the axis of movement of the working member, said sleeve encompassing a substantial length of said actuating member, said sleeve constituting hand engaging means adapted to be grasped by the operator's hand for supporting and guiding the tool in the operation thereof, and said actuating means including hand engaging means extending exteriorly of said sleeve, the working member extending from the sleeve in a direction laterally of the sleeve axis to a distance not exceeding the greatest dimenison of the other elements of the tool in the same direction.

4. In a tool of the class described, a rotating working member having a substantially conical work engaging portion extending to a substantially pointed apex, said work engaging portion comprising a toothed sector and a smooth sector, said toothed sector having a plurality of teeth each progressively longer than its adjacent tooth, the longest tooth having its forward end extending substantially to said apex, the other teeth having their forward ends extending only to the smooth sector.

5. A tool as claimed in claim 4 wherein the forward ends of the other teeth extend progressively nearer to said apex in the order of their length from shortest to longest.

6. A tool as claimed in claim 4 wherein the smooth sector is relieved adjacent the forward ends of said other teeth.

7. A tool of the class described comprising, in combination, a guide sleeve, a working member associated with said sleeve for working movement relative thereto, actuating means for effecting working movement of said working member, said actuating means comprising an actuating member movable within said sleeve on an axis substantially coaxial with the axis of the sleeve, said axes being angularly disposed with respect to the axis of movement of the working member, said sleeve encompassing a substantial length of said actuating member, the working member extending from the sleeve in a direction laterally of the sleeve axis to a distance not exceeding the greatest dimension of the other elements of the tool in the same direction, said working member having a substantially conical work engaging portion extending to a substantially pointed apex, said work engaging portion comprising a toothed sector and a smooth sector, said toothed sector having a plurality of teeth each progressively longer than its adjacent tooth, the longest tooth having its forward end extending substantially to said apex, the other teeth having their forward ends extending only to the smooth sector.

EDWARD A. MILLONIG.